(12) United States Patent
Vaittinen et al.

(10) Patent No.: US 9,582,166 B2
(45) Date of Patent: Feb. 28, 2017

(54) METHOD AND APPARATUS FOR RENDERING USER INTERFACE FOR LOCATION-BASED SERVICE HAVING MAIN VIEW PORTION AND PREVIEW PORTION

(75) Inventors: Sampo Tuomas Vaittinen, Helsinki (FI); Brenda Castro, Helsinki (FI); Tuula Karkkainen, Tampere (FI); Ari-Heikki Sarjanoja, Oulu (FI)

(73) Assignee: Nokia Technologies Oy, Espoo (FI)

( * ) Notice: Subject to any disclaimer, the term of this patent is extended or adjusted under 35 U.S.C. 154(b) by 297 days.

(21) Appl. No.: 12/780,911

(22) Filed: May 16, 2010

(65) Prior Publication Data

US 2011/0283223 A1    Nov. 17, 2011

(51) Int. Cl.
*G06F 3/0484*   (2013.01)
*G01C 21/36*   (2006.01)
*G06F 3/0481*   (2013.01)
*G06T 19/00*   (2011.01)

(52) U.S. Cl.
CPC ..... *G06F 3/04845* (2013.01); *G01C 21/3647* (2013.01); *G06F 3/04815* (2013.01); *G06T 19/00* (2013.01); *G06T 2219/028* (2013.01)

(58) Field of Classification Search
CPC ...... G06F 3/0481; G06F 3/048; G06F 3/0483; G06F 3/0482
USPC ........................ 715/838, 781, 776; 345/582
See application file for complete search history.

(56) References Cited

U.S. PATENT DOCUMENTS

| | | | |
|---|---|---|---|
| 6,028,603 A * | 2/2000 | Wang | G06F 3/0483 707/E17.026 |
| 6,169,552 B1 * | 1/2001 | Endo | G01C 21/32 345/419 |
| 6,397,145 B1 * | 5/2002 | Millington | G01C 21/36 701/432 |
| 6,563,529 B1 * | 5/2003 | Jongerius | H04N 5/23238 345/629 |
| 6,693,518 B2 * | 2/2004 | Kumata | B61L 23/00 340/435 |
| 7,190,370 B1 * | 3/2007 | Haeberli | G06Q 30/06 345/582 |
| 7,230,628 B1 * | 6/2007 | Haeberli | G06Q 30/06 345/582 |

(Continued)

FOREIGN PATENT DOCUMENTS

| | | |
|---|---|---|
| CN | 101300459 A | 11/2008 |
| WO | 2006039389 A2 | 4/2006 |
| WO | WO 2006/039389 A2 | 4/2006 |

OTHER PUBLICATIONS

Cox Digital Video Recorder Quick Reference Guide, 2004.*

(Continued)

*Primary Examiner* — David Choi
(74) *Attorney, Agent, or Firm* — Ditthavong & Steiner, P.C.

(57) ABSTRACT

A method including causing, at least in part, rendering of a user interface for a location-based service that simultaneously includes both a main view portion and a preview portion. One of the main view portion and the preview portion is caused, at least in part, to display a perspective view of one or more objects in a field of view, and the other of the main view portion and the preview portion is caused, at least in part, to display a plan view of at least a portion of the one or more objects in the field of view.

18 Claims, 10 Drawing Sheets

(56) References Cited

U.S. PATENT DOCUMENTS

| | | | | |
|---|---|---|---|---|
| 7,689,933 | B1* | 3/2010 | Parsons | G06F 3/0482 715/200 |
| 8,164,599 | B1* | 4/2012 | Kadous | G01C 21/20 345/629 |
| 8,295,589 | B2* | 10/2012 | Ofek | G06K 9/00 382/154 |
| 9,024,972 | B1* | 5/2015 | Bronder | G06T 19/006 345/633 |
| 2007/0198182 | A1* | 8/2007 | Singh | G01C 21/3647 701/431 |
| 2007/0273758 | A1* | 11/2007 | Mendoza | G06F 3/04815 348/39 |
| 2008/0291217 | A1* | 11/2008 | Vincent | G06T 17/05 345/629 |
| 2009/0167919 | A1 | 7/2009 | Anttila et al. | |
| 2009/0179895 | A1* | 7/2009 | Zhu | G06F 17/30241 345/424 |
| 2009/0240431 | A1* | 9/2009 | Chau | G01C 21/3647 701/532 |
| 2009/0249228 | A1 | 10/2009 | Cheng et al. | |
| 2009/0262145 | A1 | 10/2009 | Akita et al. | |
| 2009/0268047 | A1* | 10/2009 | Sogoh | G03B 17/20 348/222.1 |
| 2010/0123737 | A1* | 5/2010 | Williamson | G01C 21/3647 345/672 |
| 2010/0188397 | A1* | 7/2010 | Tsai | G06F 1/1626 345/419 |
| 2010/0245287 | A1* | 9/2010 | Thorn | H04N 5/23219 345/175 |
| 2010/0325563 | A1* | 12/2010 | Goldthwaite | G06F 3/04815 715/757 |
| 2010/0325589 | A1* | 12/2010 | Ofek | G06F 3/04815 715/854 |
| 2011/0010650 | A1* | 1/2011 | Hess | G06F 3/04817 715/765 |
| 2011/0234595 | A1* | 9/2011 | Poston | G06T 11/20 345/440 |
| 2011/0254860 | A1* | 10/2011 | Zontrop | A63F 13/04 345/633 |
| 2011/0261051 | A1* | 10/2011 | Meyer | B60K 35/00 345/419 |
| 2011/0283223 | A1* | 11/2011 | Vaittinen | G01C 21/3647 715/781 |
| 2011/0286660 | A1* | 11/2011 | Ofek | G06K 9/00 382/154 |

OTHER PUBLICATIONS

International Search Report for corresponding PCT Application No. PCT/FI2011/050123, Jun. 1, 2011, pp. 1-7.

Written Opinion for corresponding PCT Application No. PCT/FI2011/050123, Jun. 1, 2011, pp. 1-7.

Office Action for corresponding Chinese Patent Application No. 201180034810.3, dated Aug. 20, 2015, with English Language Summary, 5 Pages.

Office Action for corresponding Chinese Patent Application No. 201180034810.3, dated Feb. 22, 2016, with English-language summary, 8 Pages.

Office Action for corresponding European Patent Application No. 117831255-1959, dated Mar. 7, 2016, 9 Pages.

Chinese Office Action for related Chinese Patent Application No. 201180034810.3 dated Jan. 4, 2015, with English-language summary, 8 pages.

Office Action for corresponding Chinese Patent Application No. 201180034810.3, dated Sep. 5, 2016, English Language Summary Included, 8 pages.

* cited by examiner

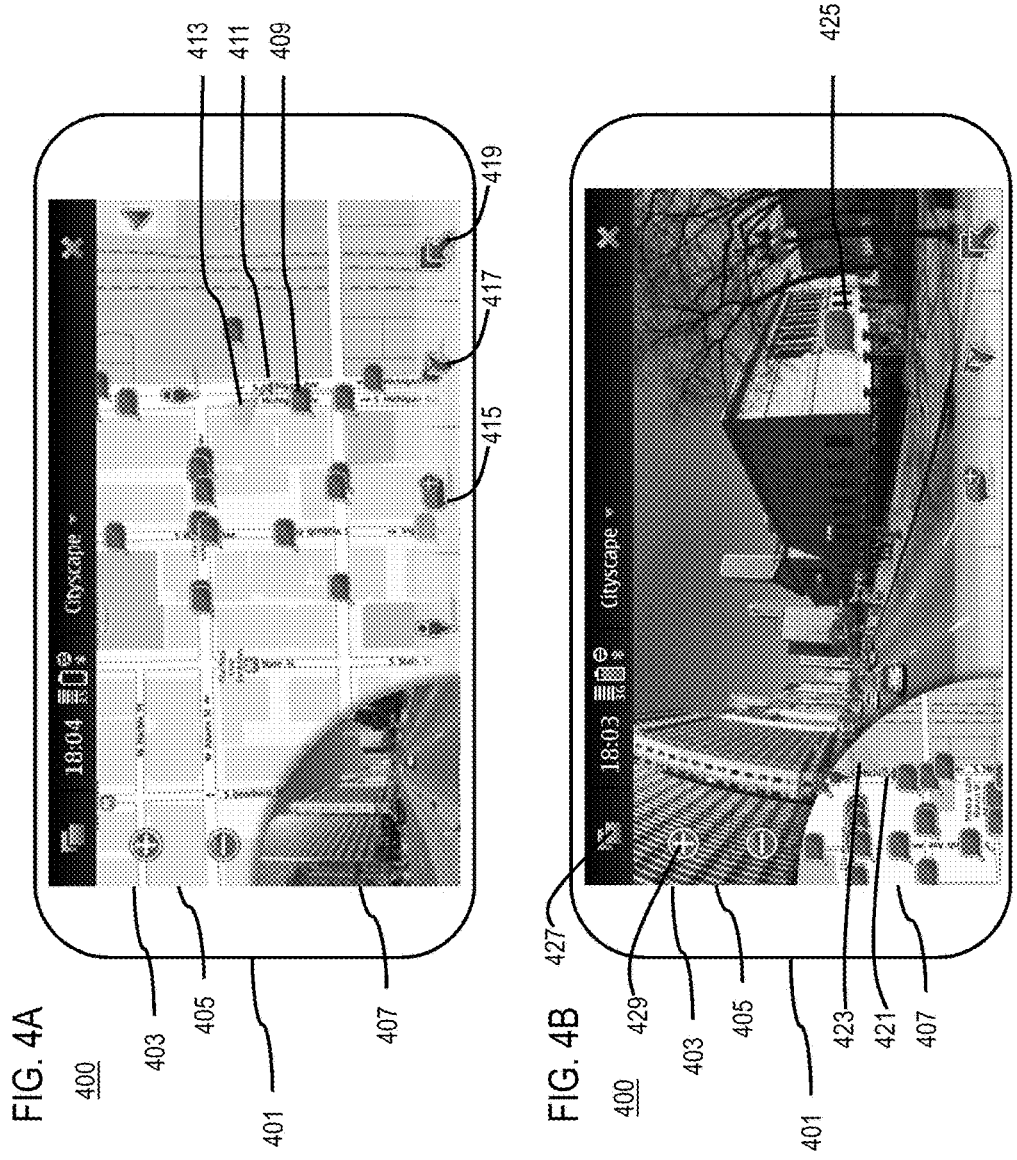

METHOD AND APPARATUS FOR RENDERING USER INTERFACE FOR LOCATION-BASED SERVICE HAVING MAIN VIEW PORTION AND PREVIEW PORTION

BACKGROUND

Service providers (e.g., wireless, cellular, Internet, content, social network, etc.) and device manufacturers are continually challenged to deliver value and convenience to consumers by, for example, providing compelling network services. One area of interest has been the development of mapping and navigating graphics (e.g., digital maps) and/or images (e.g., 360° panoramic street-level views of various locations and points of interest) augmented with, for instance, navigation tags and location relevant content. Typically, navigation, mapping, and other similar services can display either panoramic views or two-dimensional rendered maps. Each type of view has respective advantages and disadvantages. However, a user generally has to switch back and forth between such views manually, which makes it difficult for a user to grasp how these views correlate to one another.

SOME EXAMPLE EMBODIMENTS

Therefore, there is a need for an approach for rendering a user interface for a location-based service that has a main view portion and a preview portion.

According to one embodiment, a method comprises causing, at least in part, rendering of a user interface for a location-based service that simultaneously includes both a main view portion and a preview portion, wherein one of the main view portion and the preview portion is caused, at least in part, to display a perspective view of one or more objects in a field of view, and wherein the other of the main view portion and the preview portion is caused, at least in part, to display a plan view of at least a portion of the one or more objects in the field of view.

According to another embodiment, an apparatus comprising at least one processor, and at least one memory including computer program code, the at least one memory and the computer program code configured to, with the at least one processor, cause, at least in part, the apparatus to cause, at least in part, rendering of a user interface for a location-based service that simultaneously includes both a main view portion and a preview portion, wherein one of the main view portion and the preview portion is caused, at least in part, to display a perspective view of one or more objects in a field of view, and wherein the other of the main view portion and the preview portion is caused, at least in part, to display a plan view of at least a portion of the one or more objects in the field of view.

According to another embodiment, a computer-readable storage medium carrying one or more sequences of one or more instructions which, when executed by one or more processors, cause, at least in part, an apparatus to perform causing, at least in part, rendering of a user interface for a location-based service that simultaneously includes both a main view portion and a preview portion, wherein one of the main view portion and the preview portion is caused, at least in part, to display a perspective view of one or more objects in a field of view, and wherein the other of the main view portion and the preview portion is caused, at least in part, to display a plan view of at least a portion of the one or more objects in the field of view.

According to another embodiment, an apparatus comprises means for causing, at least in part, rendering of a user interface for a location-based service that simultaneously includes both a main view portion and a preview portion, wherein one of the main view portion and the preview portion is caused, at least in part, to display a perspective view of one or more objects in a field of view, and wherein the other of the main view portion and the preview portion is caused, at least in part, to display a plan view of at least a portion of the one or more objects in the field of view.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A and 4B are diagrams of user interfaces utilized in the processes of FIGS. 3A and 3B, according to various embodiments;

DESCRIPTION OF SOME EMBODIMENTS

Examples of a method, apparatus, and computer program for rendering a user interface for a location-based service that has a main view portion and a preview portion are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "image" refers to one or a series of images taken by a camera (e.g., a still camera, digital camera, video camera, camera phone, etc.) or any other imaging equipment. Although various embodiments are described with respect to a live camera view, it is contemplated that the approach described herein may be used with other live or real-time images (e.g., a still image, a live view, a live webcam view, etc.) as long as the image is associated with a location, a tilt angle, and heading of the imaging device (e.g., camera) at the time of image capture.

As used herein, the term "point of interest" (POI) refers to any point specified by a user or service provider. The term POI is also used interchangeably with the term "object." By way of example, the point of interest can be a landmark, restaurant, museum, building, bridge, tower, dam, factory, manufacturing plant, space shuttle, etc.

As used herein, the term "perspective view" refers to any view that provides some perspective to an object shown therein, either when shown using 2D or 3D displays, or using 2D or 3D images. Such perspective views can be real-time images (e.g., in an augmented reality setting using a camera of the device), a panoramic image (e.g., a pre-stored panoramic photograph), 3D modeling in virtual reality, or other modified views that attempt to show real or virtual depth to objects or surroundings whether constructed with 2D images or 3D images.

Figure 1:
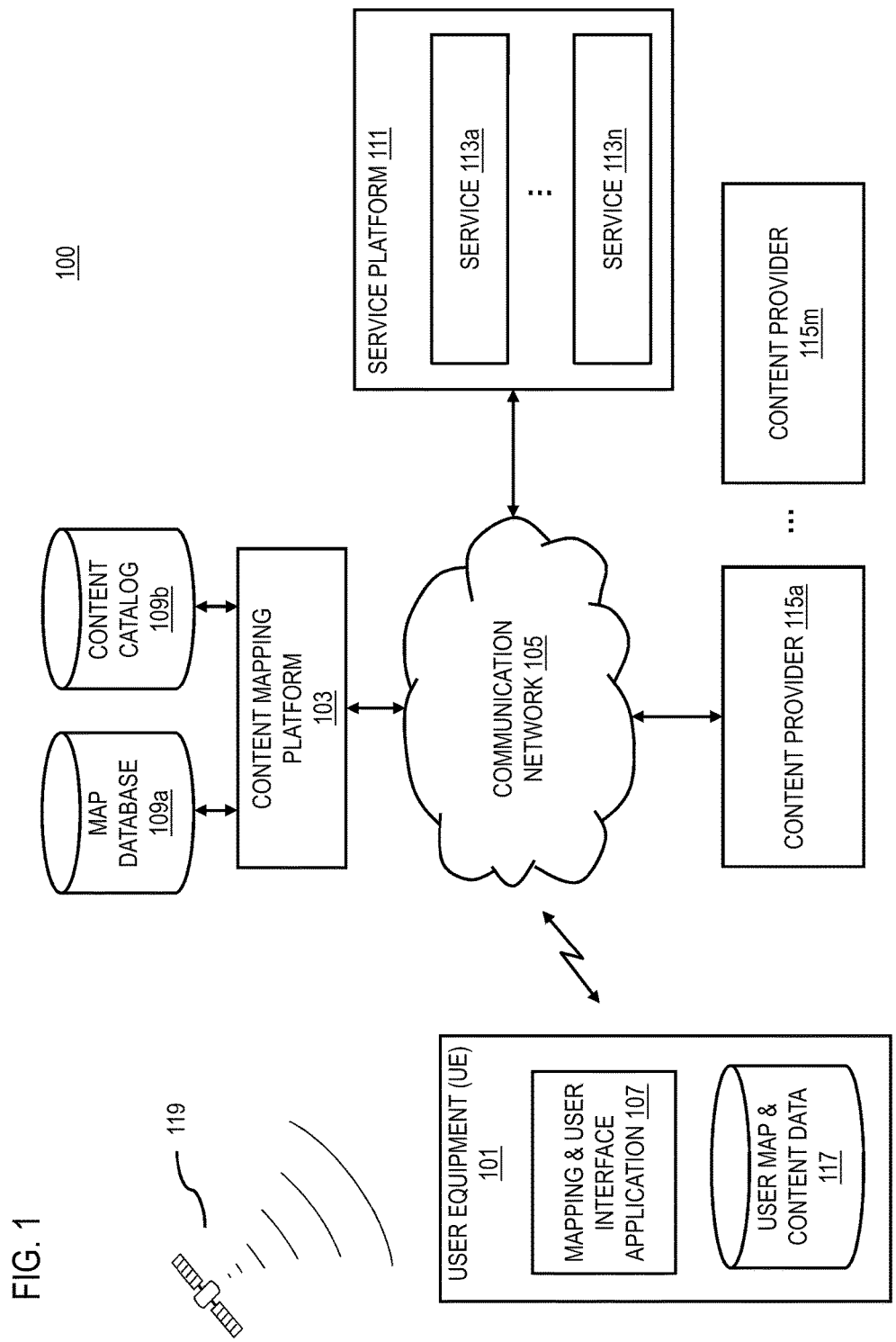
FIG. 1 is a diagram of a system capable of rendering a user interface for a location-based service that has a main view portion and a preview portion, according to one embodiment.

FIG. 1 is a diagram of a system capable of rendering a user interface (UI) for a location-based service that has a main view portion and a preview portion, according to one embodiment.

As mentioned previously, navigation, mapping, and other like services and systems display either panoramic views or two-dimensional rendered maps, but do not attempt to merge the two views. When content is presented in a 2D view, certain content might be clustered or too close to be visible for the user. When content is presented in a 3D view, e.g. a panoramic image or directly through camera view, then the visible content is limited to the current scene or position of the camera. It is usually a problem that switching views can cause confusion in the understanding of the space and location, especially when the user is not very familiar with the place in view. Some related art services show content only in the map and only when the view is maximized. Other augmented reality or mixed reality services may display content in different ways depending on the kind of content; however, typically the content is shown in a shaking manner and not affixed in a stable manner to an object or POI.

To address shortcomings of other related art systems, a system 100 of FIG. 1 introduces the capability of rendering a user interface for a location-based service that has a main view portion and a preview portion, which can allow a user to simultaneously visualize both a perspective view, for example, showing panoramic images of an area, and a corresponding plan view of a map of the area, and switch between such views as desired.

Thus, a small preview can be displayed in the mobile UI, where the most relevant content is shown. For example, when a user is browsing a panoramic view on the UI, the user has the option to preview the map showing the surroundings of what is displayed in the panorama view. Similarly, when browsing the map, the preview shows the closest panorama of the point the user has focused on the map. Both views display the content that can be found in the area, allowing a better sense of the space and location. The actions in the main view are reflected in the preview, so that the user always has a sense of where to go physically if the user happens to be in the location in view or virtually if the user is remotely browsing the area. Selecting rich content information in a crowded area on the map can open a list view of all the content in that crowded area, while selecting content on the panorama can open more specific content or list view.

The preview can easily be tapped to switch views and to navigate easily depending on the user's needs. The preview can also be hidden easily by starting a full screen view mode. If the user is navigating in the map or plan view, the user can tap in any new location in the map and that will take the user's point of view to the tapped spot on the map, and at the same time the panorama in the preview will update to the closest panorama image from that new defined spot on the map. The user can also rotate the phone or the point of view (POV) icon to move the orientation of the map, which will affect the orientation of the panorama preview as well. The panorama image can be taken from the main panorama view in low resolution to adapt in size and be quick. Using a part of the screen as a preview of a different UI view and as a way to easily switch between scenes or views.

This solution allows users to understand better their surroundings and the remote surroundings when browsing location based content or navigating in 2D maps and 3D panoramic images. The discovery of content and the understanding of the precise place to attach content become easier and nicer. Switching from one view to the other is very intuitive, as both views show the same location and orientation.

As an example, when the user stands at a current location (e.g., the Farragut West METRO Station), the user can operate a user interface of a user device (e.g., user equipment (UE) 101) to show a plan view of a map of the surrounding area (or of another area, such as a final destination of the user) in a main view portion of the user interface, while a perspective view of the surrounding area is shown in a preview portion of the user interface in order to give the user an idea of the 3D panoramic view of the surrounding area. The perspective view can be generated by using the camera of the user device to capture images of the surrounding area in real-time (e.g., in augmented reality), by using pre-stored images (e.g., previously captured images or virtual reality images), or a combination of real-time images and pre-stored images (e.g., mixed reality). The portion of the user interface showing the plan view of the map can include an orientation representation (e.g., a periscope icon with an outwardly extending cone of vision) that indicates the field of view of the perspective view. The field of vision can be adjusted by the user by adjusting the orientation of the user device (e.g., utilizing a compass or other device to determine the change in orientation), by manually manipulating the orientation representation of the field of view on the plan view of the map on the user interface, and/or by manually manipulating the view in the perspective view on the user interface. The user can switch the plan view of the map from the main view portion of the user interface to the preview portion, and thus also switch the perspective view from the preview portion to the main view portion of the user interface. This dual window configuration allows a user to easily interpret the location and orientation of the perspective view, and allows a user to quickly and intuitively navigate to a POI or otherwise determine their location.

As noted above, the perspective view can be displayed using real-time images, pre-stored (pre-recorded) images, or the system 100 can retrieve and stitch a prerecorded still image right next to the live image side by side then displays the seamlessly stitched images to the user. To make the switch seamlessly, the system 100 correlates a prerecorded panoramic image that has the same tilt angle and has directional heading right next to the live image, and displays the correlated prerecorded panoramic image on the screen. Even if two images were taken by the same device at the same location with the same tilt angle and the same directional heading, the coverage of the images can be different due to a height of the user or the settings (e.g., digital zooming, contrast, resolution, edited, clipped, etc.). If two images were taken by two devices at the same location with the same tilt angle and the same directional heading, the coverage of the images can still be different due to different specifications of the two devices. The devices can have different imaging specifications, such as LCD size, optical zoom, digital zoom, zoom wide, zoom telephoto, effective pixels, pixel density, image stabilization, aperture range, etc. which affect the quality and depth of images taken by two devices.

However, the existing photo matching technology allows near 100% matching between the live image and the prerecorded panoramic images. There are photo matching applications (e.g., photo-match online search engines which compare images pixel by pixel) for choosing the best matched panoramic still image for the live image. There are also photo stitching applications which make the boundary between the live image and a prerecorded panoramic still image seamlessly. As the user continues touching the navigational arrow touching the edge of the screen, more prerecorded panoramic still images are matched and stitched to roll out to the screen as a panoramic view on the fly.

To navigate from the current location to a POI, the user indicates to the system 100 the POI as the destination. By way of example, when the system 100 receives a target location such as the International Monetary Fund (IMF) Building as the intended POI (e.g., received as text, or on a digital map on the screen of the UE 101, etc.), the system 100 retrieves location data (e.g., an address, GPS coordinates, etc.) of the IMF, or the location data of the device used to capture a prerecorded panoramic image of the IMF (e.g., if the POI is not as well-known as the IMF, such as a carousel in a park). The system 100 then maps a route from the current location (e.g., the METRO Station) to the designated POI, and presents the route on a digital map to the user in either the main view portion or the preview portion. While the user is walking along the route, the system 100 also presents a live image view of the surrounding location on the screen in the other of the preview portion or main view portion. Whenever the user wants to switch among the perspective view in the main view portion (and the plan view in the preview portion) and the plan view in the main portion (and the perspective view in the preview portion), the user can freely do so using the user interface. Other points of interest may be located on the route, and a filter can be used to select the types of POIs that are labeled using graphic representations and which are not labeled.

Alternatively, the user can utilize the user interface to view a remote location. For example, if the user planned to visit a particular POI later in the day, then the user could locate the POI on the plan view of the map (e.g., by scrolling to the location of the POI, entering an address of the POI, searching for the POI using keywords or the name of the POI, etc.), for example, in the main view portion of the user interface. Then, the user can manipulate the orientation representation of the field of view to provide a desired vantage point. For example, if the user planned to travel down a certain road to get to the POI, then the user can manipulate the field of view to provide a vantage point along that road that the user will see while travelling down the road and arriving at the POI. With the field of view set to the desired orientation, then the user can see a preview of the perspective view of the POI in the preview portion of the user interface, and the user can switch the perspective view of the POI to the main view portion of the user interface in order to view an enlarged image of the POI. Thus, the user will be able to see what the POI looks like, thereby allowing the user to recognize the POI upon arrival at the POI later in the day. The perspective view of the POI can also include graphic representations or tags (e.g., bubbles, icons, images, text, etc.) that provide a link to content related to the POI (e.g., name, address, telephone number, weblink, etc.), which can be selected by the user in the user interface in order to obtain further content information regarding the POI.

In one embodiment, the system 100 displays on the screen of the UE 101 different portions of the prerecorded panoramic view depending upon the tilt angle and directional heading of the UE 101 as tilted and/or rotated by the user. In this embodiment, the user can change the prerecorded panoramic image in the prerecorded panoramic view, without moving/dragging a viewing tag on the screen of the UE 101.

In another embodiment, the system 100 further utilizes the augmented reality or augmented virtuality (e.g., using 3D models and 3D mapping information) to insert rich content information relevant to the POI (e.g., drawn from the Internet, user inputs, etc.) in the live image view in a real time manner. Tags are displayed on a surface of the object or POI and virtually affixed thereto in the perspective view, and shown in a fixed 3D orientation on the surface of the object or POI. The content relevant to the POI can also be seen in the prerecorded panoramic view, and the contact may be already embedded/tagged in the in the prerecorded panoramic view, or inserted in a real time manner. The POIs can be pre-set by users, service providers (e.g., wireless, cellular, Internet, content, social network, etc.), and/or device manufacturers, and the relevant content can be embedded/tagged by any one of a combination of these entities as well.

By way of example, the user selects the fourth floor of a department as a POI, and tags content information of the POI retrieved from the department store website. The system 100 saves the POI and the tagged content, and presents to the user most updated content information in the live image view and/or the prerecorded panoramic view, automatically or on demand. The content information may include: (1) a floor plan of the POI, (2) the occupants/shops/facilities located in the POI (e.g., in thumbnail images, animation, audio alerts, etc.), (3) introduction and background content with respect to the occupants/shops/facilities, (4) marketing and sales content with respect to the occupants/shops/facilities, or any other data or information tied to the POI. It is also contemplated that content may be associated with multiple floors. The content information includes live media, stored media, metadata associated with media, text information, location information of other user devices, mapping data, geo-tagged data, or a combination thereof.

While the plan view of the map can show all of the graphic representations for the objects, which link to the rich content information thereof, in a given area, the graphic representations affixed to the objects in the perspective view are only shown for objects that are visible in the field of view of the perspective view in certain embodiments. Thus, graphic representations for objects that are hidden from view in the perspective view (e.g., for objects that are hidden behind a building, or hidden behind a tree, etc.) can be omitted from the perspective view in order to prevent cluttering of the perspective view of the user interface.

As shown in FIG. 1, a user equipment (UE) 101 may retrieve content information (e.g., content and location information) and mapping information (e.g., maps, GPS data, prerecorded panoramic views, etc.) from a content mapping platform 103 via a communication network 105. The content and mapping information can be used by a mapping and user interface application 107 on the UE 101 (e.g., an augmented reality application, navigation application, or other location-based application) to a live image view and/or a prerecorded panoramic view. In the example of FIG. 1, the content mapping platform 103 stores mapping information in the map database 109a and content information in the content catalog 109b. By way of example, mapping information includes digital maps, GPS coordinates, prerecorded panoramic views, geo-tagged data, points of interest data, or a combination thereof. By way of example, content information includes one or more identifiers, metadata, access addresses (e.g., network address such as a Uniform Resource Locator (URL) or an Internet Protocol (IP) address; or a local address such as a file or storage location in a memory of the UE 101, description, or the like associated with content. In one embodiment, content includes live media (e.g., streaming broadcasts), stored media (e.g., stored on a network or locally), metadata associated with media, text information, location information of other user devices, or a combination thereof. The content may be provided by the service platform 111 which includes one or more services 113a-113n (e.g., music service, mapping service, video service, social networking service, content broadcasting service, etc.), the one or more content providers 115a-115m (e.g., online content retailers, public databases, etc.), other content source available or accessible over the communication network 105.

Additionally or alternatively, in certain embodiments, a user map and content database 117 of the UE 101 may be utilized in conjunction with the application 107 to present content information, location information (e.g., mapping and navigation information), availability information, etc. to the user. The user may be presented with an augmented reality interface associated with the application 107 and/or the content mapping platform allowing 3D objects or other representations of content and related information to be superimposed onto an image of a physical environment on the UE 101. In certain embodiments, the user interface may display a hybrid physical and virtual environment where 3D objects from the map database 109a are superimposed on top of a physical image.

By way of example, the UE 101 may execute the application 107 to receive content and/or mapping information from the content mapping platform 103 or other component of the network 105. As mentioned above, the UE 101 utilizes GPS satellites 119 to determine the location of the UE 101 to utilize the content mapping functions of the content mapping platform 103 and/or the application 107, and the map information stored in the map database 109a may be created from live camera views of real-world buildings and other sites. As such, content can be augmented into prerecorded panoramic views and/or live camera views of real world locations (e.g., based on location coordinates such as global positioning system (GPS) coordinates).

The application 107 and the content mapping platform 103 receive access information about content, determines the availability of the content based on the access information, and then presents a prerecorded panoramic view or a live image view with augmented content (e.g., a live camera view of the IMF building with augmented content, such as its origin, mission, facilities information: height, a number of floor, etc.). In certain embodiments, the content information may include 2D and 3D digital maps of objects, facilities, and structures in a physical environment (e.g., buildings).

By way of example, the communication network 105 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, and content mapping platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the application 107 and the content mapping platform 103 may interact according to a client-server model, so that the application 107 of the UE 101 requests mapping and/or content data from the content mapping platform 103 on demand. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
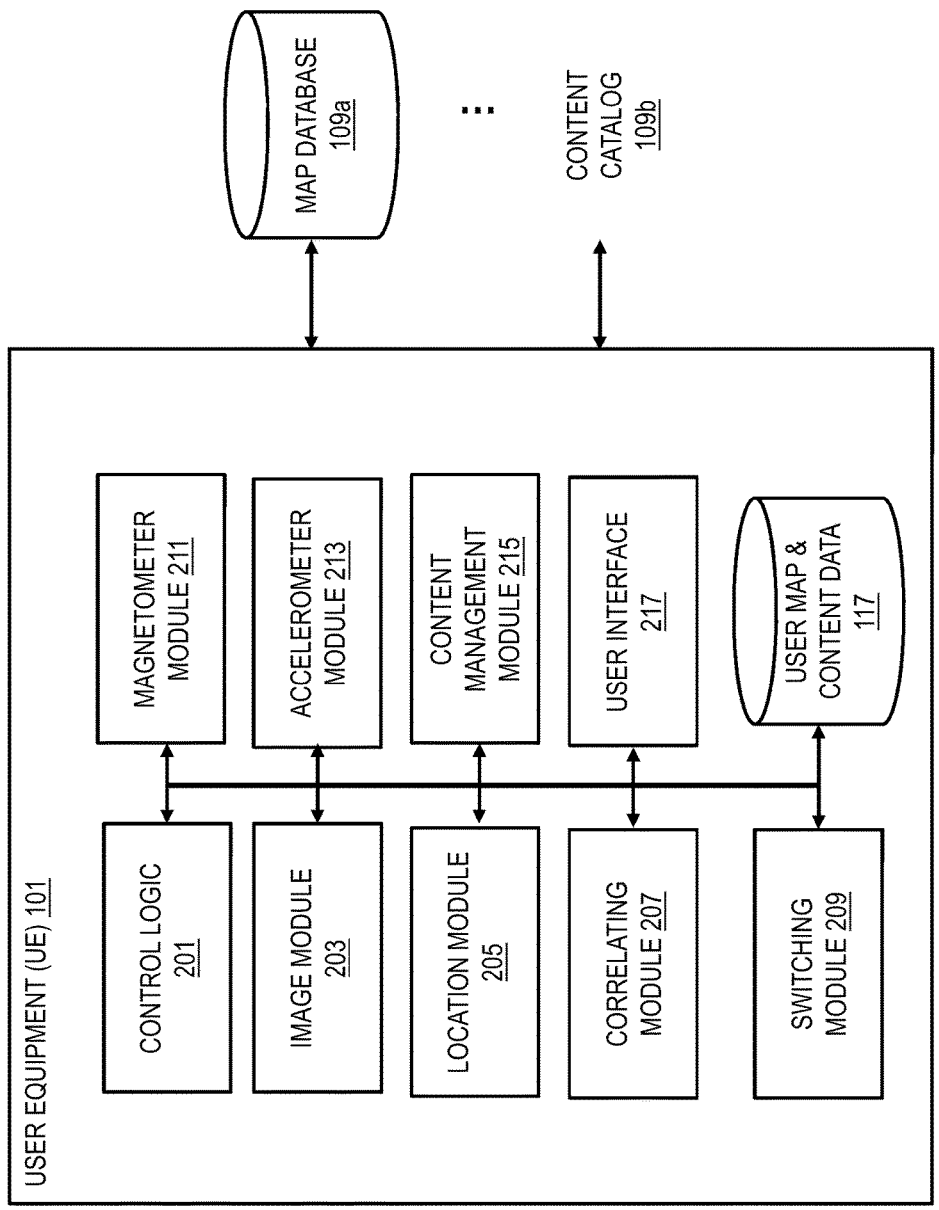
FIG. 2 is a diagram of the components of a mapping and user interface application, according to one embodiment.

FIG. 2 is a diagram of the components of a mapping and user interface application, according to one embodiment. By way of example, the mapping and user interface application 107 includes one or more components for correlating and navigating between a live camera image and a prerecorded panoramic image. It is contemplated that the functions of these components may be combined in one or more components or performed by other components of equivalent functionality. In this embodiment, the mapping and user interface application 107 includes at least a control logic 201 which executes at least one algorithm for executing functions of the mapping and user interface application 107. For example, the control logic 201 interacts with an image module 203 to provide to a user a live camera view of the surrounding of a current location of the UE 101 (e.g., the Farragut West METRO Station). The image module 203 may include a camera, a video camera, a combination thereof, etc. In one embodiment, visual media is captured in the form of an image or a series of images.

Next, the control logic 201 interacts with a location module 205 to retrieve location data of the current location of the UE 101. In one embodiment, the location data may include addresses, geographic coordinates (e.g., GPS coordinates) or other indicators (e.g., longitude and latitude information) that can be associated with the current location. For example, the location data may be manually entered by the user (e.g., entering an address or title, clicking on a digital map, etc.) or extracted or derived from any geo-tagged data. It is contemplated that the location data or geo-tagged data could also be created by the location module 205 by deriving the location associated metadata such as media titles, tags, and comments. More specifically, the location module 205 can parse the metadata for any terms that indicate association with a particular location.

In one embodiment, the location module 205 determines the user's location by a triangulation system such as a GPS, assisted GPS (A-GPS) A-GPS, Cell of Origin, wireless local area network triangulation, or other location extrapolation technologies. Standard GPS and A-GPS systems can use satellites 119 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 205 may also utilize multiple technologies to detect the location of the UE 101. GPS coordinates can provide finer detail as to the location of the UE 101. As previously noted, the location module 205 may be utilized to determine location coordinates for use by the application 107 and/or the content mapping platform 103.

Again, the control logic 201 interacts with the image module 203 to display the live camera view and location data of the current location. While displaying the live camera view of the current location, the control logic 201 interacts with the image module 203 to receive an indication of switching views by the user by, for example, touching a "Switch" icon on the screen of the UE 101. The control logic 201 interacts with a correlating module 207 to correlate the live image view with a prerecorded panoramic view with the location data, and also interacts with a switching module 209 to alternates/switch the display from the live image view to the correlated prerecorded panoramic view. Also, the switching module 209 can control the switching between which view (i.e., plan view or perspective view) is shown in the main view portion of the user interface 217, and which view is shown in the preview portion of the user interface 217.

In another embodiment, the switching module 209 interacts with a magnetometer module 211 which determines horizontal orientation or directional heading (e.g., a compass heading) of the UE 101, and an accelerometer module 213 which determines vertical orientation or an angle of elevation of the UE 101. Thereafter, the switching module 209 interact with the image module 203 to display on the screen of the UE 101 different portions of the prerecorded panoramic view depending upon the tilt angle and directional heading of the UE 101 as tilted and/or rotated by the user. Under these circumstances, the user can view different portions of the prerecorded panoramic view, without moving/dragging a viewing tag on the screen of the UE 101.

In one embodiment, horizontal directional data obtained from a magnetometer is utilized to determine the orientation of the UE 101. The magnetometer module 211 can include an instrument that can measure the strength and/or direction of a magnetic field. Using the same approach as a compass, the magnetometer is capable of determining the directional heading of a UE 101 using the magnetic field of the Earth. The front of the image capture device (e.g., a digital camera) (or another reference point on the UE 101) can be marked as a reference point in determining direction. Thus, if the magnetic field points north compared to the reference point, the angle the UE 101 reference point is from the magnetic field is known. Simple calculations can be made to determine the direction of the UE 101. This directional information may be correlated with the location information of the UE 101 to determine where (e.g., at which geographic feature or object) the UE 101 is pointing towards. This information may be utilized to select a portion of the prerecorded panoramic view to render to the user.

Further, the accelerometer module 213 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 213 can determine the angle the UE 101 is pointed as compared to Earth's gravity. In one embodiment, vertical directional data obtained from an accelerometer is used to determine the angle of elevation or tilt angle at which the UE 101 is pointing. This information in conjunction with the magnetometer information and location information may be utilized to determine a viewpoint in the prerecorded panoramic view to the user. As such, this information may be utilized in selecting available content items to present navigational information to the user. Moreover, the combined information may be utilized to determine portions of a particular digital map or a prerecorded panoramic view that may interest the user.

The control logic then interacts with the image module 203 to render a viewpoint in the prerecorded panoramic view to the user, whenever the user rotates/tilts the UE 101. As mentioned, the correlating module 207 can obtain the live image from a camera and correlate the live image with a prerecorded panoramic view via location information. In addition, the correlating module 207 uses magnetometer information, accelerometer information, or a combination thereof to determine a viewpoint to display a portion of the prerecorded panoramic view to the user.

The control logic 201 then interacts with a content management module 215 and the image module 203 to augment content information related to one or more POIs in the live image therein. The content may be received from the service platform 111, the services 113a-113n, the content providers 115a-115m, other like components, or a combination thereof. It is also contemplated that the user or another party authorized by the user may manually enter a content item. In one embodiment, the content management module 215 may create a content catalog listing all content items and associated access addresses provided to the content management module 215. In certain embodiments, the content catalog may include additional descriptive information and other metadata describing the content. The available media content or stream can take many forms (e.g., live video feeds, photographs, audio files, etc.) and can be delivered using any number means (e.g., streaming media, downloaded media, spontaneously created media, etc.). The content management module 215 includes one or more sub-modules or application programming interfaces (APIs) (not pictured) for receiving and/or detecting the media content in its native format or for converting the media content to a media format compatible with the mapping and augmented reality application 107. In other embodiments, the content management module 215 may initiate a download or installation of the components (e.g., codecs, player applications, etc.) needed to verify the content or stream. The content data can be cached or save in the user map and content database 117.

To facilitate finding specific content or features, the content management module 215 enables the user to input search criteria (e.g., a content item, person, city, weather, etc.) and to get guidance for finding the direction where the searched content item is located in the real physical world. The content management module 215 also enables a user to specify a time period so as to navigate content information using both location and time. In one embodiment, the default time for viewing the content and mapping information is the present. If a time period is set as future, the content management module 215 will determine the one or more content items based on the specified time, such as what will be on sales in the next three hours on the $4^{th}$ floor of the department store. By way of example, the sales content and product information can be presented on a floor plan with representations of each product placed according to the associated location information.

The content can be depicted as a thumbnail overlaid on the user interface map at the location corresponding to a point of interest (e.g., a floor) or a portion of the point of interest (e.g., facilities on the floor), and affixed to the POI at a fixed 3D orientation. As discussed, the user interface may be a graphical user interface. In addition or alternatively, the user interface may be an audio or tactile interface. In one embodiment, the content management nodule 215 presents only those content items that are available at the specified time and are not associated with any limitations or exclusive restrictions. This embodiment provides a user experience in which users can simply select from the presented content items and be assured that the selected item will be available with a single selection click. In other embodiments, the content management module 215 may present all available content and differentiate the presentation of content available with a single click versus content associated with additional limitations or restrictions. The specific types of presentations can be specified by the user, content provider 115, network operator, service platform 111, or a combination thereof. The content management module 215 then determines whether to periodically update the content information.

In certain embodiments, when there is much more content available than can be displayed in the existing user interface, the content management nodule 215 constantly animates the display of the content items so that new content keeps appearing while older content disappears. This animation process also makes the user interface more entertaining to users and gives a feeling of the world being "alive" with activity.

In certain embodiments, the user map and content database 117 includes all or a portion the information in the map database 109a and the content catalog 109b. From the selected viewpoint, a live image view augmented with the content can be provided on the screen of the UE 101. In certain embodiments, the content management nodule 215 provides a correlated prerecorded panoramic view from the selected view point with content generated or retrieved from the database 117 or the content mapping platform 103. The content information can be embedded/tagged in the correlated prerecorded panoramic view previously by another apparatus or by the content management nodule 215 on demand and/or in a real time manner when displays the correlated prerecorded panoramic view on the screen of the UE 101.

Content and mapping information may be presented to the user via a user interface 217, which may include various methods of communication. For example, the user interface 217 can have outputs including a visual component (e.g., a screen), an audio component (e.g., a verbal instructions), a physical component (e.g., vibrations), and other methods of communication. User inputs can include a touch-screen interface, microphone, camera, a scroll-and-click interface, a button interface, etc. Further, the user may input a request to start the application 107 (e.g., a mapping and user interface application) and utilize the user interface 217 to receive content and mapping information. Through the user interface 217, the user may request different types of content, mapping, or location information to be presented. Further, the user may be presented with 3D or augmented reality representations of particular locations and related objects (e.g., buildings, terrain features, POIs, etc. at the particular location) as part of a graphical user interface on a screen of the UE 101. As mentioned, the UE 101 communicates with the content mapping platform 103 service platform 111, and/or content providers 115a-115m to fetch content, mapping, and or location information. The UE 101 may utilize requests in a client server format to retrieve the content and mapping information. Moreover, the UE 101 may specify location information and/or orientation information in the request to retrieve the content and mapping information.

Figure 3A:
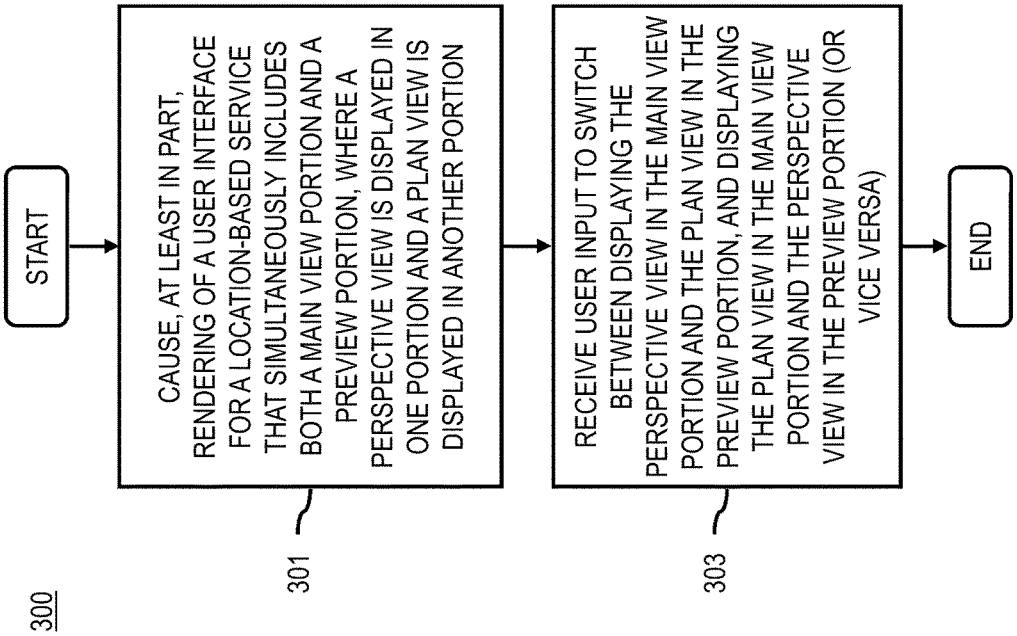
FIG. 3A is a flowchart of a process for rendering a user interface for a location-based service that has a main view portion and a preview portion, according to one embodiment.
Figure 3B:
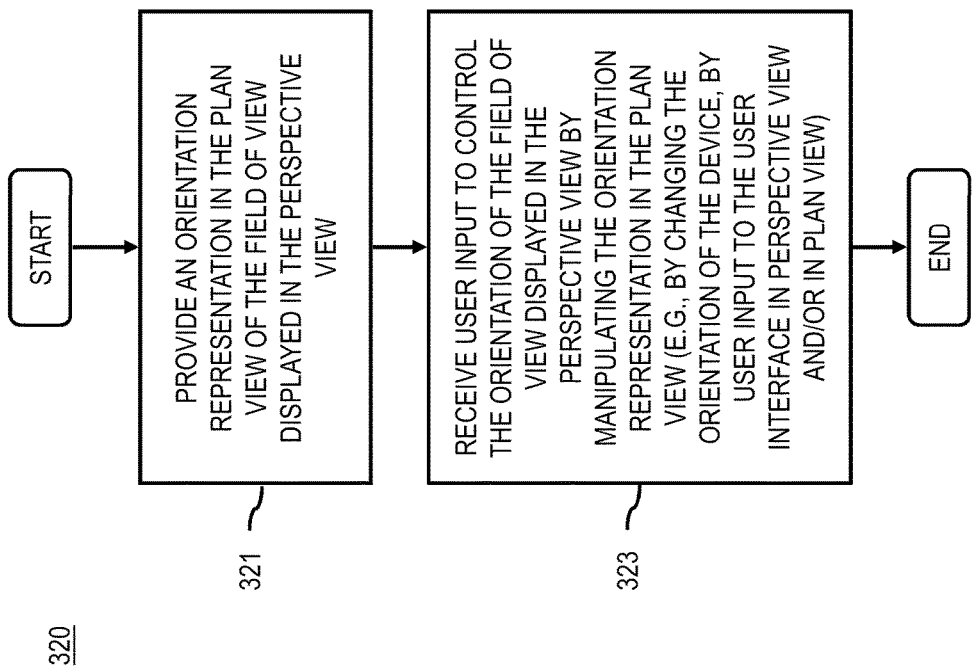
FIG. 3B is a flowchart of a process for controlling an orientation of a field of view of a perspective view by manipulating an orientation representation in a plan view, according to one embodiment.

FIG. 3A is a flowchart of a process for rendering a user interface for a location-based service that has a main view portion and a preview portion, according to one embodiment. FIG. 3B is a flowchart of a process for controlling an orientation of a field of view of a perspective view by manipulating an orientation representation in a plan view, according to one embodiment. FIGS. 4A, 4B, 5, and 6 are diagrams of user interfaces utilized in the processes of FIGS. 3A and 3B, according to various embodiments.

Figure 8:
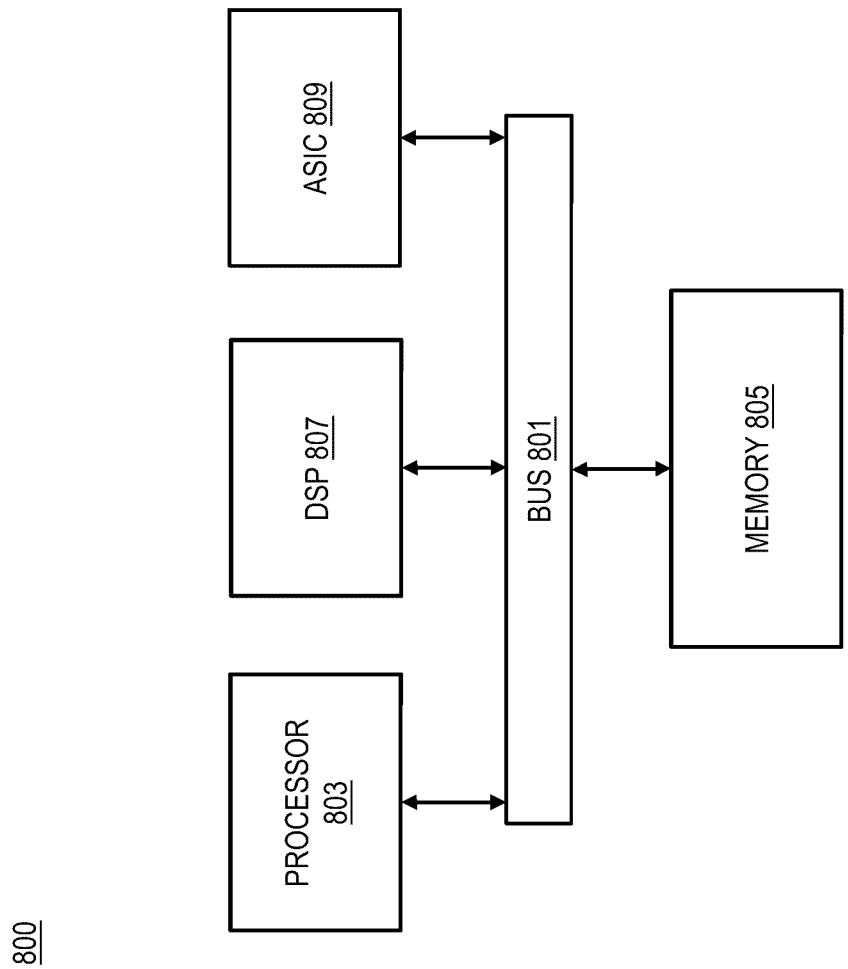
FIG. 8 is a diagram of a chip set that can be used to implement an embodiment of the invention.

In one embodiment, the mapping and user interface application 107 performs the process 300 and is implemented in, for instance, a chip set including a processor and a memory as shown FIG. 8. In step 301, the mapping and user interface application 107 causes, at least in part, rendering of a user interface for a location-based service that simultaneously includes both a main view portion and a preview portion, where a perspective view is displayed in one portion (i.e., either the main view portion or the preview portion) and a plan view is displayed in another portion (i.e., the other of the preview portion or the main view portion). Then, in step 303, the mapping and user interface application 107 receives (e.g., from the user interface 217) user input to switch between displaying the perspective view in the main view portion and the plan view in the preview portion, and displaying the plan view in the main view portion and the perspective view in the preview portion (or vice versa, i.e. switch between displaying the plan view in the main view portion and the perspective view in the preview portion, and displaying the perspective view in the main view portion and the plan view in the preview portion). For example, the user can touch the preview portion in order to switch the view shown in the preview portion with the view shown in the main view portion, or the user can tilt the UE 101 to a particular angle (e.g., horizontal) such that the angle can automatically trigger a switching of the views (e.g., when the UE 101 is horizontal, then, if the plan view is shown in the preview portion, it can be switched to the main view portion). After the user orders a switch, the mapping and user interface application 107 causes, at least in part, an alternating of the presentation of which view is shown in which view portion on a screen of the UE 101.

When generating the perspective view, mapping and user interface application 107 determines an optimal image of the one or more objects for the perspective view from real-time images and/or pre-stored images. For example, the application 107 can compare various stored images of the particular field of view, and determine which image is in the best focus, at the best vantage point (e.g., closest vantage point to the field of view selected by the user), and then utilize the best image available. Then, the application can cause, at least in part, rendering of the perspective view in the user interface using the optimal image. Additionally, it is noted that the perspective view can be formed by providing smooth transitions between real-time images, pre-stored images, and/or a mix of the real-time images and the pre-stored images with the graphic representation overlaid onto the surface of the object in order to provide the best possible perspective view in a smooth and continuous manner.

Also, it should be noted that when the application 107 receives input changing the orientation of the display in either the perspective view or the plan view, then the application 107 simultaneously changes the orientation of the display of the other of perspective view and the plan view in correspondence to the input. Thus, any change in one view will simultaneously result in a change in the other view. For example, if the user interface is showing real-time images in the perspective view and pans around in a circle, then the plan view will show a point of view icon panning around in a circular motion as well. Also, if the user is scanning around various locations on the plan view, then the perspective view will be simultaneously updated to show images at the selected location at the selected orientation.

In one embodiment, the mapping and user interface application 107 performs the process 320 and is implemented in, for instance, a chip set including a processor and a memory as shown FIG. 8. In step 321, the mapping and user interface application 107 causes, at least in part, rendering of an orientation representation in the plan view of a field of view displayed in the perspective view. For example, the orientation representation can include a graphic representation, either as a 2D or 3D graphic, of a person or of a periscope or other object that implies a particular point of view, and also a cone shaped area extending therefrom that shows the direction in which the field of view is projected and generally the area covered by the field of view. Then, in step 323, the mapping and user interface application 107 receives (e.g., from the user interface 217) user input to control the orientation of the field of view displayed in the perspective view by manipulating the orientation representation in the plan view. Thus, for example, the user can manipulate the orientation representation in the plan view by using a touch screen of the user interface to move the periscope to another location or turn the periscope in the different direction (e.g., by moving the users finger around the circumference of the periscope shown in the plan view), or by using the touch screen to move or turn the perspective view (e.g., by zooming or swiping motions), or by physically changing the directional orientation of the mobile device (e.g., turning the device to turn the periscope and the perspective view either when using real-time images or pre-stored images). Based on such input, the mapping and user interface application 107 causes, at least in part, a change in orientation of the orientation representation in the plan view, and a corresponding change in orientation of the field of view in the perspective view on the screen of the UE 101.

FIGS. 4A and 4B are diagrams of user interfaces utilized in the processes of FIGS. 3A and 3B, according to various embodiments. FIGS. 4A and 4B depict user equipment 400, such as a mobile device, that includes a housing 401 having a display screen 403, such as a touch screen. The display screen 403 is presently displaying a user interface that simultaneously shows both a main view portion 405 and a preview portion 407. In this embodiment, the preview portion 407 is shown as a semicircular window at a lower left-hand corner of the main view portion; however, the preview portion can be provided in any shape and at any location on the main view portion. In the embodiment shown in FIG. 4A, the main view portion 405 is presently displaying a plan view in which a map is shown, and the preview portion 407 is presently displaying a perspective view in which a panoramic image is shown. The plan view and the perspective view can either be displaying such views based on a present location and/or orientation of the user equipment 400, or based on a location selected by the user.

In the plan view, which is shown in the main view portion 405 in FIG. 4A, a orientation representation is shown that includes, in this embodiment, a periscope graphic (or also generically referred to herein as a point of view icon) 411 and a cone shaped area 413 extending from the periscope graphic 411 that shows the direction in which the field of view of the perspective view is projected and generally the area covered by the field of view. Thus, the periscope graphic 411 and the cone shaped area 413 extending therefrom directly correlate to the field of view shown in the perspective view. The image shown in the perspective view can be a real-time image captured using a camera of the UE 101, a pre-stored image that is provided by a service provider and/or stored on the UE 101, or a mixed of real-time images and pre-stored images.

In the embodiment shown in FIG. 4A, the user interface displayed on the display screen 403 shows various graphic representations (e.g., a bubble, as shown, or other image, icon, text, etc.) 409 that correspond to rich content information relevant to various objects/POIs. The graphic representations 409 that are shown in plan view can also be displayed in the perspective view (see, e.g., FIGS. 4B, 5, and 6) on a surface of the object/POI and virtually affixed thereto, and shown in a fixed 3D orientation on the surface of the object/POI. The user can select the graphic representation in either the plan view or in the perspective view, and a pop-up window will appear that provides the rich content information. The content information includes live media, stored media, metadata associated with media, text information, location information of other user devices, mapping data, geo-tagged data, or a combination thereof.

In the embodiment shown in FIG. 4A, the user interface displayed on the display screen 403 shows various icons along a bottom edge of the main view portion 405 that provide the user with various menu options. For example, icon 415 can be selected by a user (e.g., using the touch screen) to add a graphic representation for an object/POI. Thus, for example, if the user wants to add a new graphic representation to a particular building where a friend of the user lives, then the user can select icon 415 and drag and drop a new graphic representation at a desired location, and then populate the graphic representation with desired content information. Additionally, icon 417 can be selected by the user in order to filter the types of graphic representations that are displayed on the user interface. For example, if the user wants to merely show graphic representations of restaurants within the plan view and/or perspective view, then the user can select the icon 417, which will provide the user with a preset list of categories from which the user can select and/or allow the user to define a desired filter or perform a text search to define the desired filter. Additionally, icon 419 can be selected by the user in order to toggle between the dual window view (i.e., including both a main view portion and a preview portion) shown in FIGS. 4A, 4B, 4, and 6, and a full screen view mode in which one of either the plan view or the perspective view is shown without the preview portion 407.

FIG. 4B is a diagram of a user interface utilized in the processes of FIGS. 3A and 3B, according to another embodiment. FIG. 4B depicts user equipment 400 with the display screen 403 displaying the user interface with the main view portion 405 showing a perspective view and the preview portion 407 showing a corresponding plan view. In FIG. 4B, the preview portion 407 showing the plan view includes the orientation representation shown as a periscope graphic 421 and a cone shaped area 423 extending from the periscope graphic 421 that shows the direction in which the field of view of the perspective view is projected and generally the area covered by the field of view. Also, in FIG. 4B, the main view portion 405 showing the perspective view includes graphic representations, for example, bubble 425, which correspond to rich content information relevant to various objects/POIs.

At any given instant of time, the user can switch which view (i.e., perspective view or plan view) is shown in the main view portion 405 and which view is shown in the preview portion 407, for example, by selecting a toggle icon 427. Also, the user can zoom in and out (e.g., simultaneously in both views, or in just one of the views, such as the view shown in the main view portion) using the plus and minus zoom icons 429.

Figure 5:
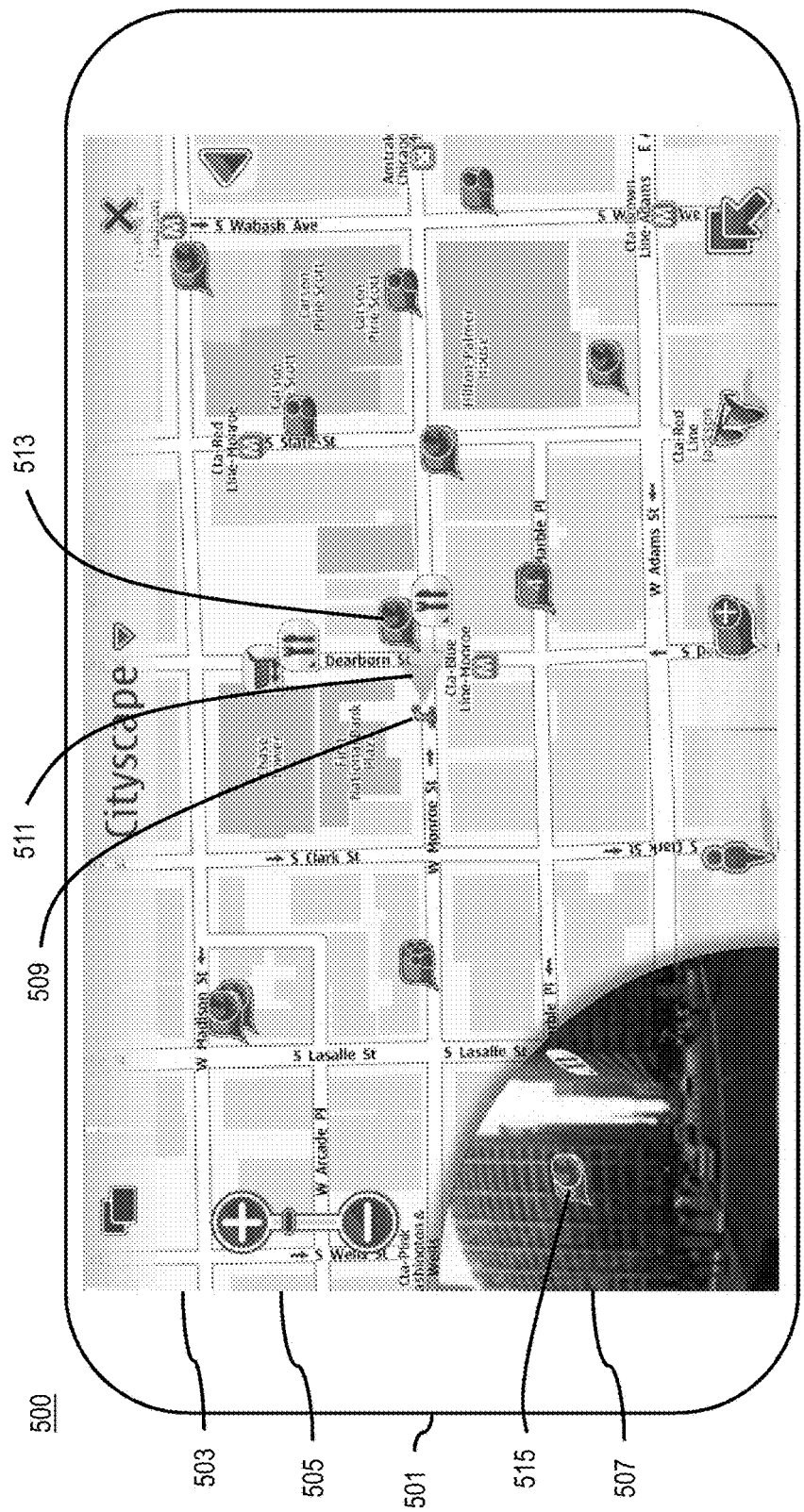
FIG. 5 is a diagram of a user interface utilized in the processes of FIGS. 3A and 3B, according to one embodiment.

FIG. 5 is a diagram of a user interface utilized in the processes of FIGS. 3A and 3B, according to another embodiment. FIG. 5 depicts user equipment 500, such as a mobile device, that includes a housing 501 having a display screen 503. The display screen 503 is presently displaying a user interface that simultaneously shows both a main view portion 505 and a preview portion 507. In the embodiment shown in FIG. 5, the main view portion 505 is presently displaying a plan view in which a map is shown, and the preview portion 507 is presently displaying a perspective view in which a panoramic image is shown. The plan view and the perspective view can either be displaying such views based on a present location and/or orientation of the user equipment 500, or based on a location selected by the user.

In FIG. 5, the main view portion 505 showing the plan view includes the orientation representation shown as a periscope graphic 509 and a cone shaped area 511 extending from the periscope graphic 509 that shows the direction in which the field of view of the perspective view is projected and generally the area covered by the field of view. Also, the main view portion 505 includes graphic representations, for example, bubble 513, which correspond to rich content information relevant to the respective object/POI. Furthermore, the preview portion 507 includes graphic representations, such as bubble 515, which corresponds to the same object/POI as bubble 513 in the plan view. The graphic representation 515 displayed in the perspective view is shown on a surface of the object/POI and virtually affixed thereto, and shown in a fixed 3D orientation on the surface of the object/POI. For example, the graphic representation 515 is affixed to a most prominent surface of the object/POI, as viewed in the perspective view or as preset by the user or service provider. The graphical representation can be a bubble icon, an image (e.g., set by the user, such as a picture of a person that live sin the building, or set by the service provider), icon that is representative of the category of the object/POI (e.g., a fork and knife indicating a restaurant POI, a shopping cart represent a store POI, etc.), text (e.g., name or description of the object/POI), etc.

Figure 6:
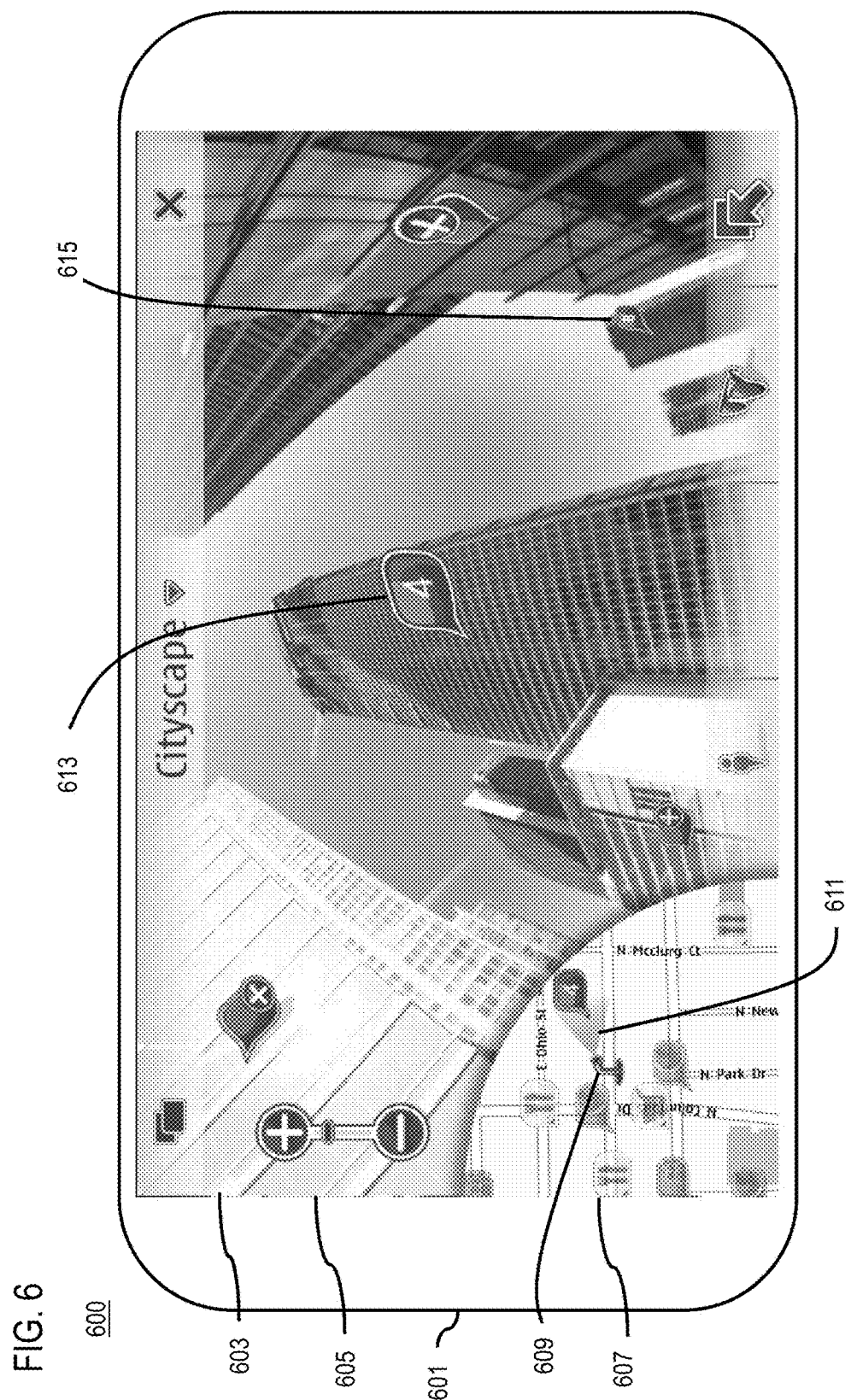
FIG. 6 is a diagram of a user interface utilized in the processes of FIGS. 3A and 3B, according to one embodiment.

FIG. 6 is a diagram of a user interface utilized in the processes of FIGS. 3A and 3B, according to another embodiment. FIG. 6 depicts user equipment 600 that includes a housing 601 having a display screen 603. The display screen 603 is presently displaying a user interface that simultaneously shows both a main view portion 605 and a preview portion 607. In the embodiment shown in FIG. 6, the main view portion 605 is presently displaying a perspective view in which a panoramic image is shown, and the preview portion 607 is presently displaying a plan view in which a map is shown. The plan view and the perspective view can either be displaying such views based on a present location and/or orientation of the user equipment 600, or based on a location selected by the user.

In FIG. 6, the preview portion 607 showing the plan view includes the orientation representation shown as a periscope graphic 609 and a cone shaped area 611 extending from the periscope graphic 609 that shows the direction in which the field of view of the perspective view is projected and generally the area covered by the field of view. Also, the main view portion 605 includes graphic representations, for example, bubble 613, which correspond to rich content information relevant to the respective object/POI. Furthermore, the main view portion 605 includes other graphic representations, for example bubble 615, which correspond to rich content information relevant to other objects/POIs that are visible in the field of view of the perspective view. While the plan view of the map can show all of the graphic representations for the objects, which link to the rich content information thereof, in a given area, the graphic representations affixed to the objects in the perspective view are only shown for objects that are visible in the field of view of the perspective view in certain embodiments. Thus, graphic representations for objects that are hidden from view in the perspective view (e.g., for objects that are hidden behind a building, or hidden behind a tree, etc.) are omitted from the perspective view in order to prevent cluttering of the perspective view of the user interface.

The processes described herein for rendering a user interface for a location-based service that has a main view portion and a preview portion may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
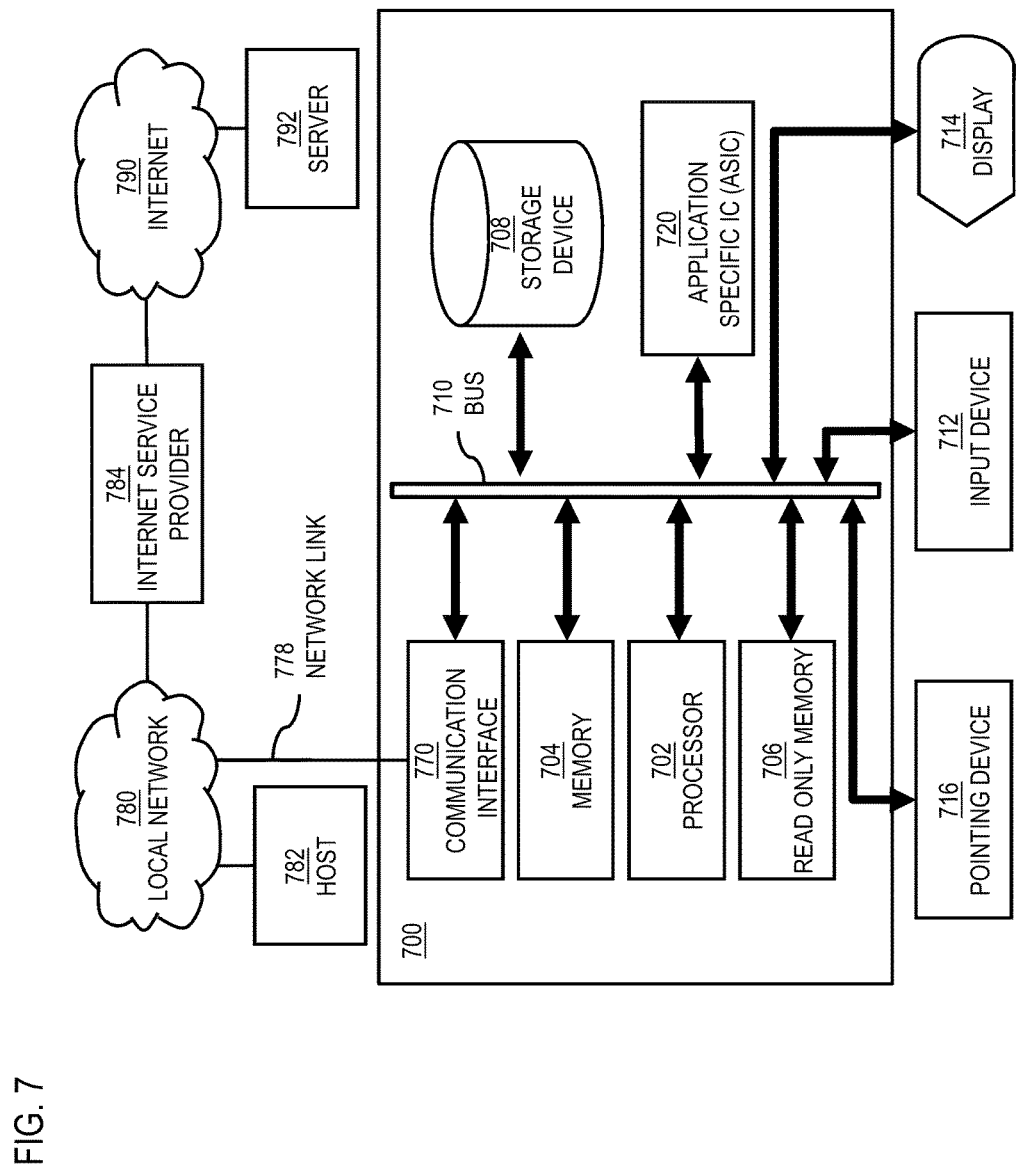
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to render a user interface for a location-based service that has a main view portion and a preview portion as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of rendering a user interface for a location-based service that has a main view portion and a preview portion.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to render a user interface for a location-based service that has a main view portion and a preview portion. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for rendering a user interface for a location-based service that has a main view portion and a preview portion. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for rendering a user interface for a location-based service that has a main view portion and a preview portion, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for rendering a user interface for a location-based service that has a main view portion and a preview portion to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to render a user interface for a location-based service that has a main view portion and a preview portion as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of rendering a user interface for a location-based service that has a main view portion and a preview portion.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to render a user interface for a location-based service that has a main view portion and a preview portion. The memory 805 also stores the data associated with or generated by the execution of the inventive steps.

Figure 9:
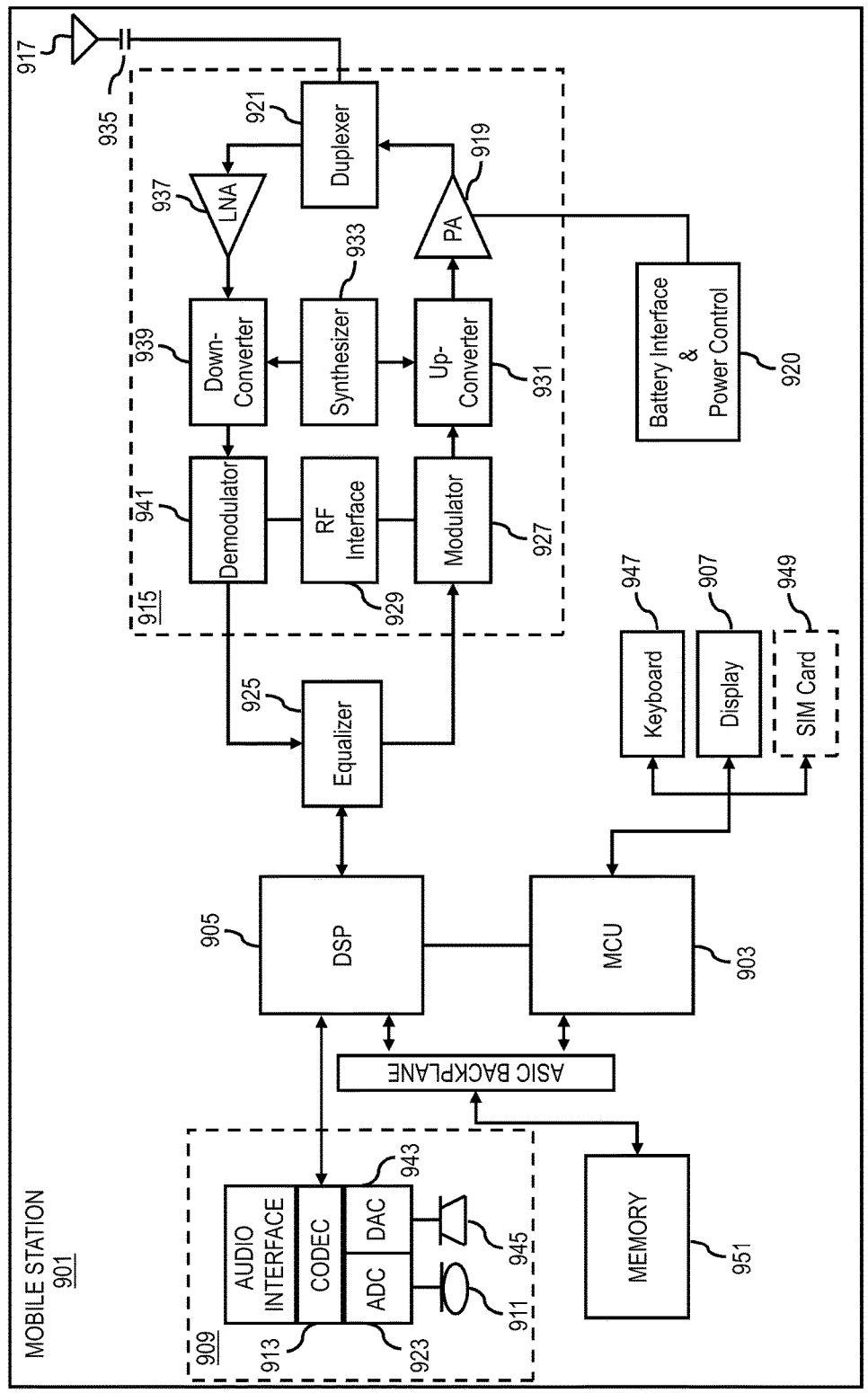
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of rendering a user interface for a location-based service that has a main view portion and a preview portion. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of rendering a user interface for a location-based service that has a main view portion and a preview portion. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to render a user interface for a location-based service that has a main view portion and a preview portion. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
causing, at least in part, rendering of a user interface for a location-based service that simultaneously includes both a main view portion and a preview portion,
wherein one of the main view portion and the preview portion is caused, at least in part, to display a perspective view of one or more objects in a field of view, wherein the perspective view continually includes, at least in part, constant real time imagery,
wherein the other of the main view portion and the preview portion is caused, at least in part, to display a plan view of at least a portion of the one or more objects in the field of view,
wherein the plan view includes an orientation representation of an orientation of the field of view displayed in the perspective view,
wherein one or more graphical representations corresponding to rich content information are displayed in the main view portion; and
receiving user configuration input to switch between a first configuration in which the perspective view is displayed in the main view portion in a first region of a display and the plan view is displayed in the preview portion in a second region of the display, and a second configuration in which the plan view is displayed in the main view portion in the first region of the display and the perspective view is displayed in the preview portion in the second region of the display, wherein the perspective view continually includes, at least in part, constant real time imagery; and
receiving user icon orientation input to change an icon orientation of the orientation representation by manipulating the orientation representation in the plan view while simultaneously changing the orientation of the display of the perspective view in correspondence to the user icon orientation input.

2. A method of claim 1, wherein the graphical representations include bubble shapes.

3. A method of claim 1, further comprising:
receiving one or more real-time images of the one or more objects in the field of view; and
causing, at least in part, a presentation of the one or more real-time images in the perspective view.

4. A method of claim 1, further comprising:
receiving input changing an orientation and/or a location of the display in either the perspective view or the plan view; and
simultaneously changing the orientation and/or the location of the display of the other of perspective view and the plan view in correspondence to the input.

5. A method of claim 1, further comprising:
retrieving content associated with an object of the one or more objects in the field of view; and
causing, at least in part, rendering of a graphic representation relating to the content on the object in the plan view and/or the perspective view.

6. A method of claim 1, further comprising:
receiving pre-stored images of the one or more objects in the field of view,
wherein the perspective view includes the pre-stored images.

7. A method of claim 1, further comprising:
receiving real-time images captured by the mobile device of the one or more objects in the field of view; and
receiving pre-stored images of the one or more objects in the field of view,
wherein the perspective view shows a mix of the real-time images and the pre-stored images.

8. An apparatus comprising:
at least one processor; and
at least one memory including computer program code for one or more programs, the at least one memory and the computer program code configured to, with the at least one
processor, cause the apparatus to perform at least the following, cause, at least in part, rendering of a user interface for a location-based service that simultaneously includes both a main view portion and a preview portion,
wherein one of the main view portion and the preview portion is caused, at least in part, to display a perspective view of one or more objects in a field of view, wherein the perspective view continually includes, at least in part, constant real time imagery,
wherein the other of the main view portion and the preview portion is caused, at least in part, to display a plan view of at least a portion of the one or more objects in the field of view,
wherein the plan view includes an orientation representation of an orientation of the field of view displayed in the perspective view,
wherein one or more graphical representations corresponding to rich content information relevant to objects and/or points-of-interest are displayed in the main view portion,
receive user configuration input to switch between a first configuration in which the perspective view is displayed in the main view portion in a first region of a display and the plan view is displayed in the preview portion in a second region of the display, and a second configuration in which the plan view is displayed in the main view portion in the first region of the display and the perspective view is displayed in the preview portion in the second region of the display, wherein the perspective view continually includes, at least in part, constant real time imagery, and
receive user icon orientation input to change an icon orientation of the orientation representation by manipulating the orientation representation in the plan view while simultaneously changing the orientation of the display of the perspective view in correspondence to the user icon orientation input.

9. An apparatus of claim 8, wherein the graphical representations include bubble shapes.

10. An apparatus of claim 8, wherein the apparatus is further caused to:
receive one or more real-time images of the one or more objects in the field of view; and
cause, at least in part, a presentation of the one or more real-time images in the perspective view.

11. An apparatus of claim 8, wherein the apparatus is further caused to:
receive input changing an orientation and/or a location of the display in either the perspective view or the plan view; and
simultaneously change the orientation and/or the location of the display of the other of perspective view and the plan view in correspondence to the input.

12. An apparatus of claim 8, wherein the apparatus is further caused to:
retrieve content associated with an object of the one or more objects in the field of view; and cause, at least in part, rendering of a graphic representation relating to the content on the object in the plan view and/or the perspective view.

13. An apparatus of claim 8, wherein the apparatus is further caused to:
receive pre-stored images of the one or more objects in the field of view,
wherein the perspective view includes the pre-stored images.

14. An apparatus of claim 8, wherein the apparatus is further caused to:
receive real-time images captured by the mobile device of the one or more objects in the field of view; and
receive pre-stored images of the one or more objects in the field of view,
wherein the perspective view shows a mix of the real-time images and the pre-stored images.

15. A non-transitory computer-readable storage medium carrying one or more sequences of one or more instructions which, when executed by one or more processors, cause an apparatus to at least perform the following steps:
causing, at least in part, rendering of a user interface for a location-based service that simultaneously includes both a main view portion and a preview portion,
wherein one of the main view portion and the preview portion is caused, at least in part, to display a perspective view of one or more objects in a field of view, wherein the perspective view continually includes, at least in part, constant real time imagery,
wherein the other of the main view portion and the preview portion is caused, at least in part, to display a plan view of at least a portion of the one or more objects in the field of view,
wherein the plan view includes an orientation representation of an orientation of the field of view displayed in the perspective view,
wherein one or more graphical representations corresponding to rich content information are displayed in the main view portion, and
receive user configuration input to switch between a first configuration in which the perspective view is displayed in the main view portion in a first region of a display and the plan view is displayed in the preview portion in a second region of the display, and a second configuration in which the plan view is displayed in the main view portion in the first region of the display and the perspective view is displayed in the preview portion in the second region of the display, wherein the perspective view continually includes, at least in part, constant real time imagery; and
receive user icon orientation input to change an icon orientation of the orientation representation by manipulating the orientation representation in the plan view while simultaneously changing the orientation of the display of the perspective view in correspondence to the user icon orientation input.

16. A method of claim 1,
wherein the plan view includes an orientation representation of a directional orientation of the field of view displayed in the perspective view,
wherein the method further comprises receiving user input via a touchscreen to control the directional orientation of the field of view displayed in the perspective view by manipulating the orientation representation displayed in the plan view.

17. An apparatus of claim 8,
wherein the plan view includes an orientation representation of a directional orientation of the field of view displayed in the perspective view,
wherein the apparatus is further caused to receive user input via a touchscreen to control the directional orientation of the field of view displayed in the perspective view by manipulating the orientation representation displayed in the plan view.

18. A computer-readable storage medium of claim 15,
wherein the plan view includes an orientation representation of a directional orientation of the field of view displayed in the perspective view,
wherein the apparatus is further caused to receive user input via a touchscreen to control the directional orientation of the field of view displayed in the perspective view by manipulating the orientation representation displayed in the plan view; and the graphical representations include bubble shapes.

* * * * *